(12) United States Patent
Hu

(10) Patent No.: US 10,672,556 B2
(45) Date of Patent: *Jun. 2, 2020

(54) WIRELESS CHARGING DEVICE FOR AN ELECTRONIC DEVICE

(71) Applicant: CORNING INCORPORATED, Corning, NY (US)

(72) Inventor: Jr-Nan Hu, New Taipei (TW)

(73) Assignee: CORNING INCORPORATED, Corning, NY (US)

( * ) Notice: Subject to any disclaimer, the term of this patent is extended or adjusted under 35 U.S.C. 154(b) by 15 days.

This patent is subject to a terminal disclaimer.

(21) Appl. No.: 15/982,452

(22) Filed: May 17, 2018

(65) Prior Publication Data

US 2018/0268993 A1 Sep. 20, 2018

Related U.S. Application Data

(63) Continuation of application No. 14/707,463, filed on May 8, 2015, now Pat. No. 10,002,709.

(Continued)

(51) Int. Cl.
*H02J 7/00* (2006.01)
*H01F 38/14* (2006.01)
(Continued)

(52) U.S. Cl.
CPC ............. *H01F 38/14* (2013.01); *C03C 17/10* (2013.01); *H01F 27/2804* (2013.01);
(Continued)

(58) Field of Classification Search
CPC ............. C03C 17/10; C03C 2217/253; C03C 2217/256; C03C 2217/72; C03C 2218/119; H01F 27/2804; H01F 27/36; H01F 38/14; H01F 41/041; H02J 7/00; H02J 27/12; H02J 7/34; H02J 7/36; H02J 50/00; H02J 50/90; H02J 50/10; H02J 50/70; H02J 5/005; H02J 7/0042; H02J 7/025
See application file for complete search history.

(56) References Cited

U.S. PATENT DOCUMENTS 8,395,353 B2 3/2013 Wang et al.
8,421,574 B2 4/2013 Suzuki et al.
(Continued)

FOREIGN PATENT DOCUMENTS

CN 201222535 Y 4/2009
CN 103515698 A 1/2014
(Continued)

OTHER PUBLICATIONS

English Translation of JP2016569995 Office Action dated Mar. 6, 2019; 6 Pages; Japanese Patent Office.
(Continued)

*Primary Examiner* — Vuthe Siek
(74) *Attorney, Agent, or Firm* — Kevin M. Johnson

(57) ABSTRACT

A method of making a wireless charging device for an electronic device includes printing a decoration layer on a surface of a glass or glass-ceramic substrate using a nonconductive ink. A coil is printed on the decoration layer, and an electromagnetic interference absorber layer is applied over the printed coil.

21 Claims, 10 Drawing Sheets

Related U.S. Application Data

(60) Provisional application No. 62/005,422, filed on May 30, 2014.

(51) Int. Cl.

| | | |
|---|---|---|
| *C03C 17/10* | (2006.01) | |
| *H02J 50/70* | (2016.01) | |
| *H02J 50/10* | (2016.01) | |
| *H01F 27/28* | (2006.01) | |
| *H01F 27/36* | (2006.01) | |
| *H01F 41/04* | (2006.01) | |

(52) U.S. Cl.
CPC ........... *H01F 27/36* (2013.01); *H01F 41/041* (2013.01); *H02J 7/0042* (2013.01); *H02J 50/10* (2016.02); *H02J 50/70* (2016.02); *C03C 2217/253* (2013.01); *C03C 2217/256* (2013.01); *C03C 2217/72* (2013.01); *C03C 2218/119* (2013.01)

(56) References Cited

U.S. PATENT DOCUMENTS

| | | |
|---|---|---|
| 8,461,801 B2 | 6/2013 | Chen |
| 8,541,974 B2 | 9/2013 | Farahani |
| 9,473,209 B2 | 10/2016 | Cooper et al. |
| 9,991,731 B2 | 6/2018 | Ichikawa |
| 2008/0246346 A1 | 10/2008 | Harris et al. |
| 2010/0156695 A1 | 6/2010 | Sim et al. |
| 2011/0241614 A1 | 10/2011 | Yeh |
| 2012/0069506 A1 | 3/2012 | Lai et al. |
| 2013/0113421 A1 | 5/2013 | Han et al. |
| 2013/0127408 A1 | 5/2013 | Chang et al. |
| 2013/0169222 A1 | 7/2013 | Yoon et al. |
| 2013/0207294 A1 | 8/2013 | Jeon et al. |
| 2013/0209819 A1 | 8/2013 | Noda et al. |
| 2013/0221909 A1 | 8/2013 | Lee |
| 2013/0241576 A1 | 9/2013 | Senninger et al. |
| 2013/0257361 A1 | 10/2013 | Chen |
| 2013/0257368 A1 | 10/2013 | Lau et al. |
| 2013/0271070 A1 | 10/2013 | Hirano |
| 2013/0278207 A1 | 10/2013 | Yoo |
| 2014/0111147 A1* | 4/2014 | Soar ................. H01F 27/365 320/108 |
| 2014/0125900 A1 | 5/2014 | Li |
| 2014/0132459 A1 | 5/2014 | Hu |
| 2014/0197017 A1 | 7/2014 | Lien et al. |
| 2014/0209691 A1* | 7/2014 | Finn ................. G06K 19/07769 235/492 |
| 2014/0247226 A1 | 9/2014 | Chiu et al. |
| 2014/0307186 A1 | 10/2014 | Yun et al. |
| 2015/0002086 A1 | 1/2015 | Matos et al. |

FOREIGN PATENT DOCUMENTS

| | | |
|---|---|---|
| CN | 103515704 A | 1/2014 |
| WO | 2011163544 A2 | 12/2011 |

OTHER PUBLICATIONS

English Translation of CN2015800414071 Search Report dated Jan. 17, 2018, 2 Pages; Chinese Patent Office.
International Search Report of the International Searching Authority; PCT/US2015/032894; dated Oct. 15, 2015; 4 Pages; European Patent Office.

* cited by examiner

WIRELESS CHARGING DEVICE FOR AN ELECTRONIC DEVICE

CROSS-REFERENCE TO RELATED APPLICATIONS

This application is a continuation of U.S. application Ser. No. 14/707,463 filed May 8, 2015, which claims the benefit of priority to U.S. Provisional Application No. 62/005,422 filed May 30, 2014, the content of which is incorporated herein by reference.

FIELD

The present disclosure relates generally to wireless charging of electronic devices.

BACKGROUND

The current handheld devices usually have multiple functions and usually access or transmit a lot of data via 3G or LTE wireless technology. Although the power requirements of these wireless networks are high, thin design is a trend for handheld devices, which constrains the battery capacity of the handheld devices. When a handheld device has low power, the usual solution is to connect the handheld device to a power source using a wired connection. The handheld device may be plugged into a power outlet using a charging adapter or may be plugged into a notebook computer or other electronic device with a larger battery capacity using a USB cable. However, if the user of the handheld device does not have access to a suitable charging adapter or USB cable, the user may not be able to charge the handheld device. In the event that the user does not have access to a suitable charging adapter or a USB cable, it would be beneficial for the user to be able to tap into the power stored in the electronic device having the larger battery capacity.

SUMMARY

The present disclosure relates to wireless charging devices that can be integrated with electronic devices as covers and used to enable wireless charging of the electronic devices. One of the electronic devices may be a portable computer or portable power bank with a relatively large battery capacity, while another of the electronic devices may be a handheld device having a relatively small battery capacity. With the wireless charging devices mounted on the portable device and handheld device, energy can be transferred from the portable device to the handheld device through an electromagnetic field created by the wireless charging device mounted on the portable device. In illustrative embodiments, the wireless charging devices include printed coils on surfaces of glass or glass-ceramic substrates. The wireless charging devices can be made very thin such that integration of the wireless charging devices with the electronic devices will not significantly increase the thicknesses of the electronic devices, allowing the electronic devices to retain their thin design.

It is to be understood that both the foregoing summary and the following detailed description are exemplary. The accompanying drawings are included to provide a further understanding of the embodiments and are incorporated in and constitute a part of this specification.

BRIEF DESCRIPTION OF THE DRAWINGS

The following is a description of the figures in the accompanying drawings. The figures are not necessarily to scale, and certain features and certain views of the figures may be shown exaggerated in scale or in schematic in the interest of clarity and conciseness.

FIG. 4b shows an exploded view of the structure of FIG. 4a.

FIG. 5b shows a bridge structure used in the transmitter coil of FIG. 5a.

FIG. 7b shows a layer structure around the connection area of the transmitter coil of FIG. 7a.

FIG. 9b shows an exploded view of the structure of FIG. 9a.

FIG. 10b shows a connection structure used in the receiver coil of FIG. 10a.

DETAILED DESCRIPTION

Figure 1:
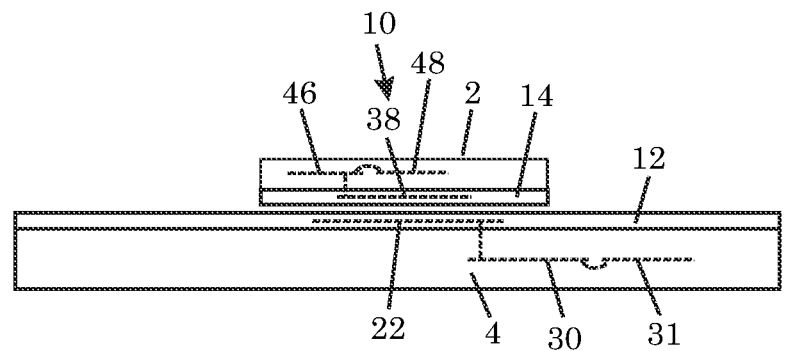
FIG. 1 is a diagram of a wireless charging system involving a host device and a parasitic device.

FIG. 1 is a diagram of a wireless charging system 10 involving a "parasite device" 2 and a "host device" 4. The term "parasite device" is used to describe the device that is going to receive power via the wireless charging system 10, while the term "host device" is used to describe the device that will provide power via the wireless charging system 10. In general, the host device 4 will have a power source, which may be in the form of a battery having a larger capacity than the battery in the parasite device or a connection to a power outlet. For illustration purposes, the parasite device 2 may be a handheld device, such as a smart phone, a portable media player, a wearable device, or a tablet, and the host device 4 may be a portable device, such as a portable computer or a portable power bank. The wireless charging system 10 includes a wireless charging transmitter device 12 mounted on the host device 4 and a wireless charging receiver device 14 mounted on the parasite device 2. With the wireless charging transmitter device 12 and wireless charging receiver device 14 in their mounted positions, it will be possible to inductively charge the parasite device 2 using power from the host device 4.

Figure 2A:
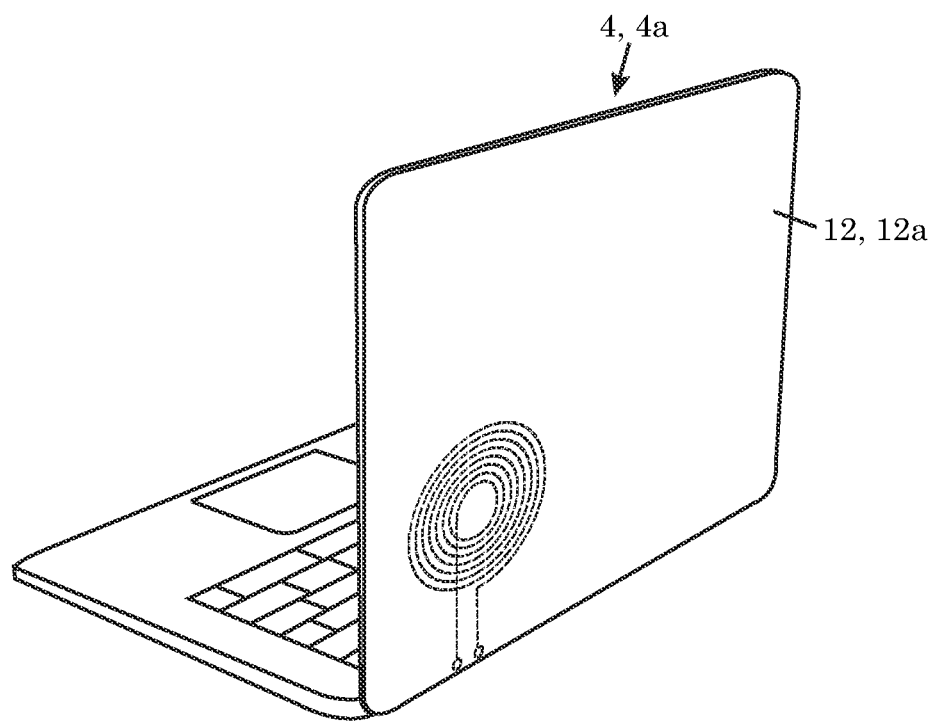
FIG. 2a shows a portable computer with a wireless charging transmitter device as a top cover.
Figure 2B:
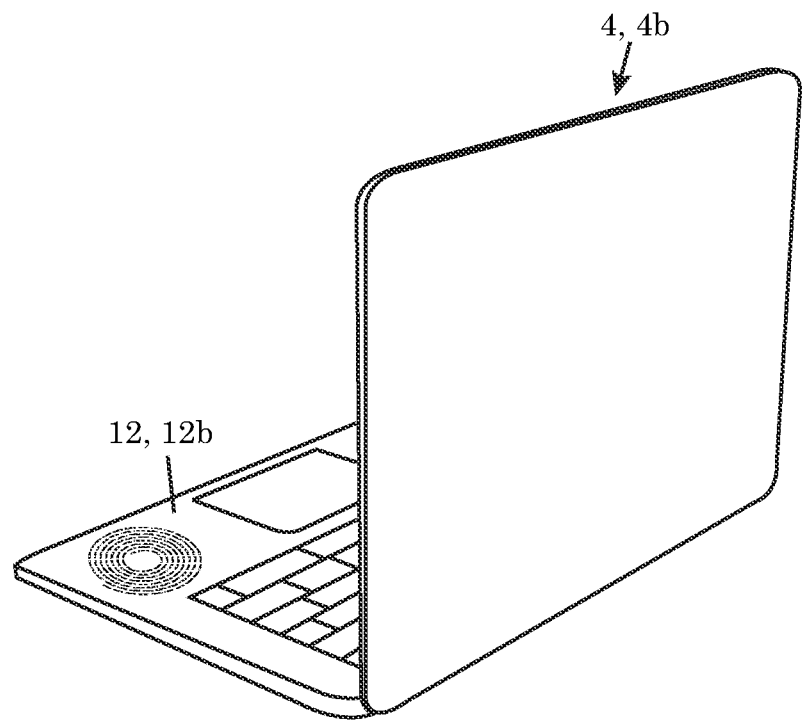
FIG. 2b shows a portable computer with a wireless charging transmitter device as a palm rest cover.
Figure 2C:
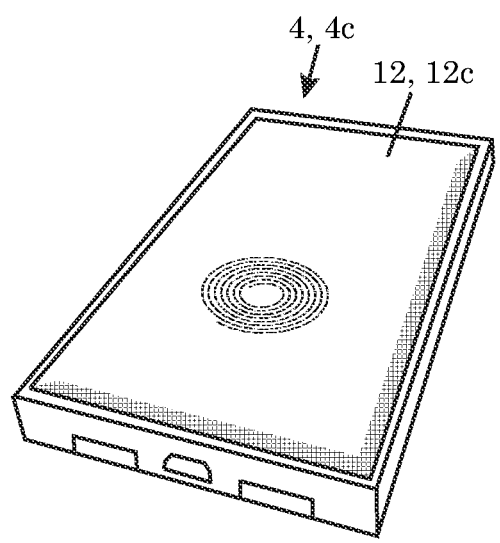
FIG. 2c shows a portable power bank with a wireless charging transmitter device as a top cover.
Figure 3A:
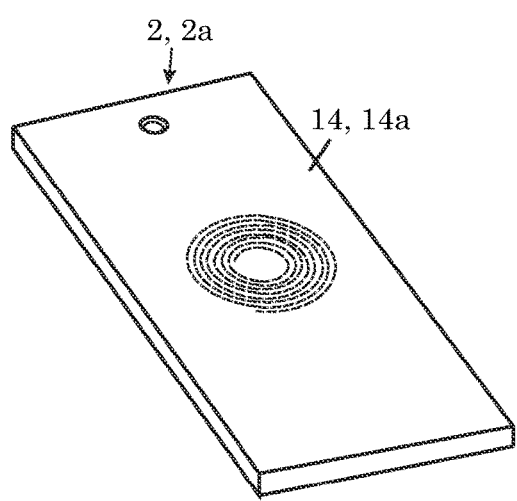
FIG. 3a shows a smart phone with a wireless charging receiver device as a back cover.
Figure 3B:
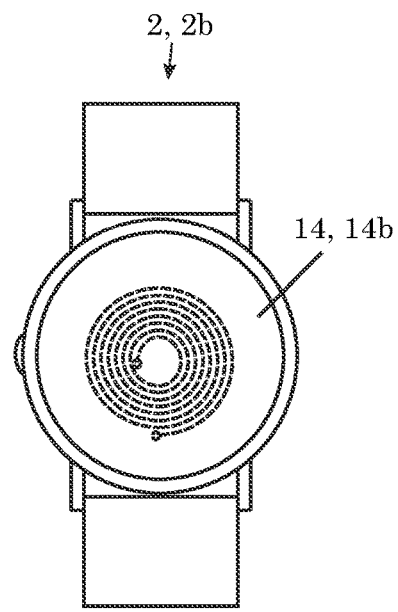
FIG. 3b shows a smart watch with a wireless charging receiver device as a back cover.

FIGS. 2a-2c show various examples of mounting the wireless charging transmitter device 12 on a host device 4, and FIGS. 3a and 3b show two examples of mounting the wireless charging receiver device 14 on a parasite device 2. In FIG. 2a, the host device 4 is a portable computer 4a, and the wireless charging transmitter device 12 is used as a top cover 12a for the portable computer 4a. In FIG. 2b, the host device 4 is a portable computer 4b, and the wireless charging transmitter device 12 is used as a palm rest cover 12b for the portable computer 4b. In FIG. 2c, the host device 4 is a portable power bank (or battery pack) 4c, and the wireless charging transmitter device 12 is used as a top cover 12c for the portable power bank 4c. In FIG. 3a, the parasite device 2 is a smart phone 2a, and the wireless charging receiver device 14 is used as a back cover 14a for the smart phone 2a. In FIG. 3b, the parasite device 2 is a smart watch 2b, and the wireless charging receiver device 14 is used as a back cover 14b. Thus the form factors of the wireless charging transmitter device 12 and wireless charging receiver device 14 can be selected to match where they would be mounted on the host device 4 and parasite device 2, respectively.

Figure 4A:
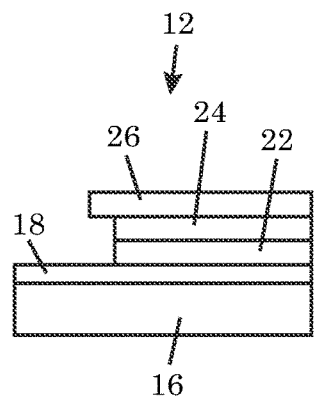
FIG. 4a shows a layer structure of a wireless charging transmitter device.
Figure 4B:
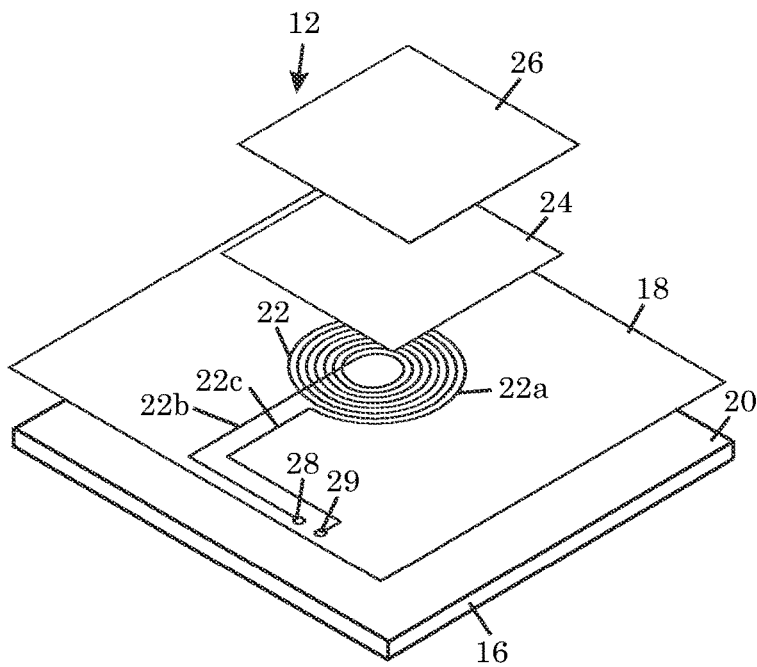

FIGS. 4a and 4b show a layer structure of the wireless charging transmitter device 12 according to one illustrative embodiment. In these figures, the wireless charging transmitter device 12 includes a substrate 16, which in one embodiment is made of glass or glass ceramic. The substrate 16 will have a cover shape and size dictated by the desired form factor of the wireless charging transmitter device 12, or by an area on the host device to be covered by the wireless charging transmitter device 12. A decoration layer 18 is applied on the inner surface 20 of the substrate 16. A transmitter coil 22 is applied on the decoration layer 18. In some cases, the decoration layer 18 may be omitted so that the transmitter coil 22 is applied on the inner surface 20 of the substrate 16 without intervention of the decoration layer 18. In the embodiment illustrated in FIG. 4b, the transmitter coil 22 has a flat spiral coil 22a. The ends of the spiral coil 22a are connected to leads 22b, 22c, which terminate in electrical contacts 28, 29. An insulation layer 24 is applied on the transmitter coil 22, and an electromagnetic interference (EMI) absorber layer 26 is applied on the insulation layer 24. The EMI absorber layer 26 should cover the entire transmitter coil 22 area.

Figure 5A:
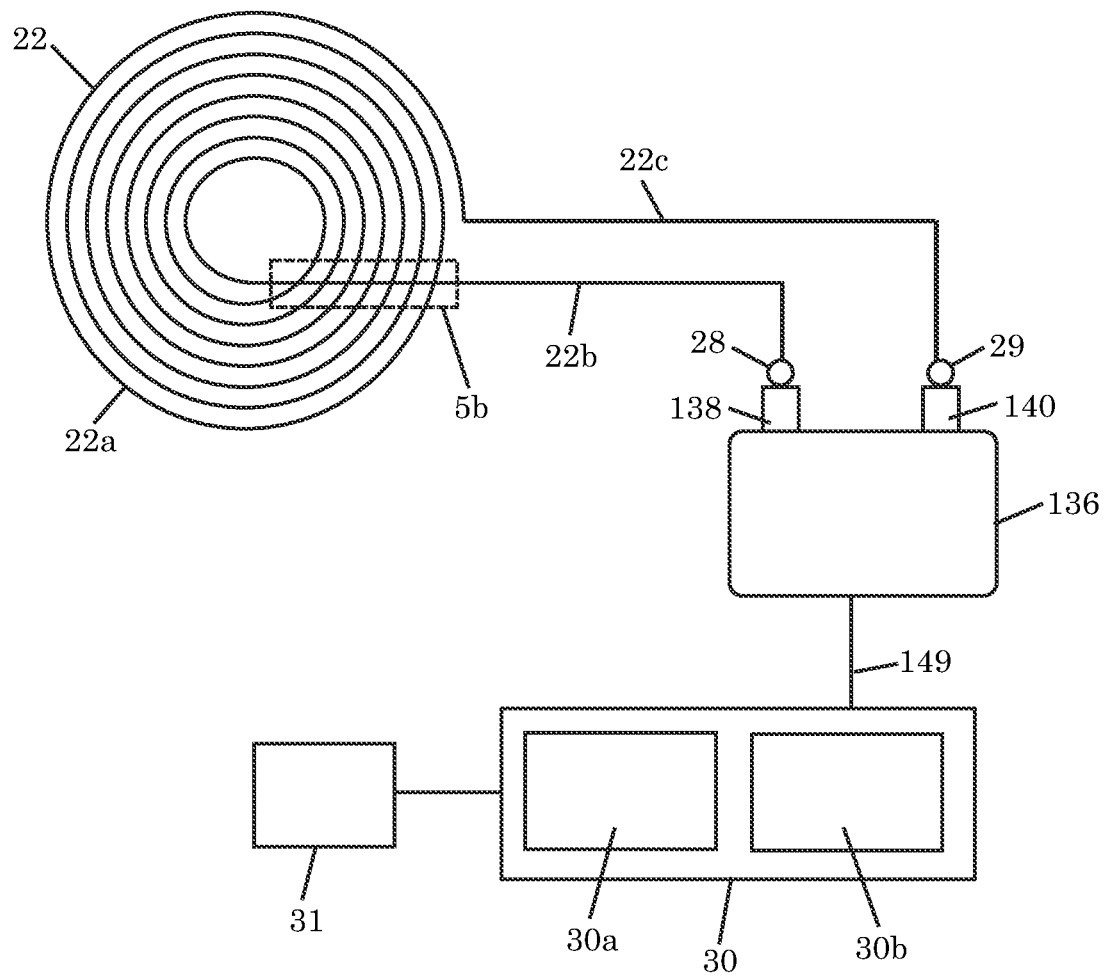
FIG. 5a shows a transmitter coil coupled to a wireless charging control circuit.
Figure 5B:
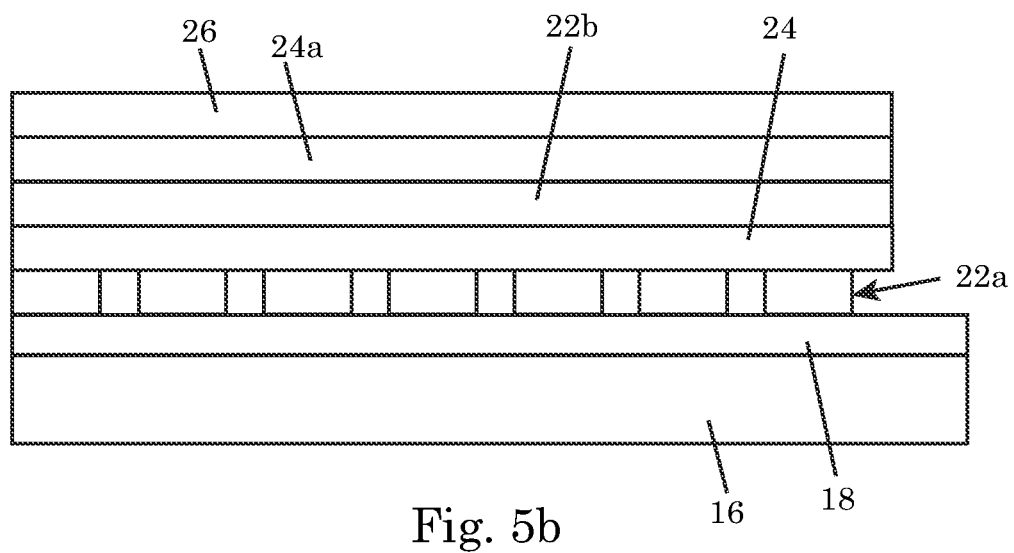

FIG. 5a shows connection of the leads 22b, 22c to a "host" wireless charging control circuit 30. The host wireless charging control circuit 30 is connected to a "host" power source 31. The term "host" is intended to associate the wireless charging control circuit 30 and power source 31 with the host device. (In FIG. 5a, the EMI absorber layer, the insulation layer, the decoration layer, and substrate are not shown so as to focus on the connection between the transmission coil 22 and the wireless charging control circuit 30.) FIG. 5b shows a layer structure at the bridge area 5b of FIG. 5a. In FIG. 5b, the lead 22b of the transmitter coil 22 may be printed on the insulation layer 24. Then, another insulation layer 24a may be applied over the lead 22b. The remaining layers are as described with respect to FIGS. 4a and 4b. Returning to FIG. 5a, the host wireless charging control circuit 30 will receive voltage from the host power source 31 and convert the received voltage to high frequency alternating current (AC), which will be used to pulse the transmitter coil 22. High frequency may be 100 KHz to 200 KHz, for example. An electromagnetic field will be produced around the transmitter coil 22 when the AC flows through the transmitter coil 22. The magnitude and direction of the electromagnetic field will depend on the shape of the transmitter coil 22 and the direction and magnitude of the AC through the transmitter coil 22. The wireless charging control circuit 30 may include, for example, a power amplifier 30a and an impedance transformer 30b. In general, the wireless charging host control circuit 30 may have any suitable configuration to convert voltage received from the host power source 31 to high frequency AC and pulse the transmitter coil 22.

Figure 6A:
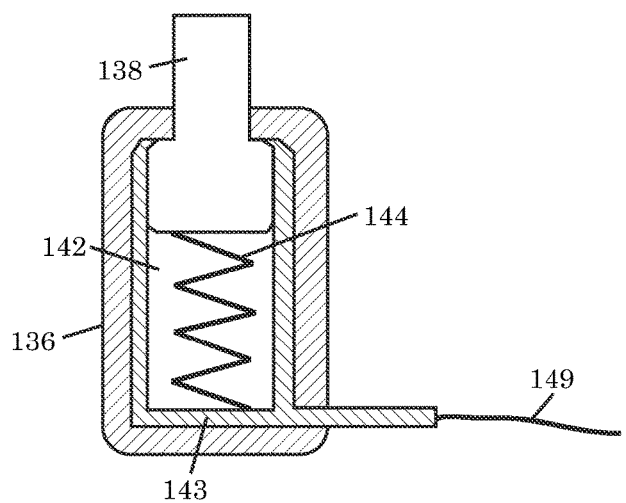
FIG. 6a is a cross-section of a connector.
Figure 6B:
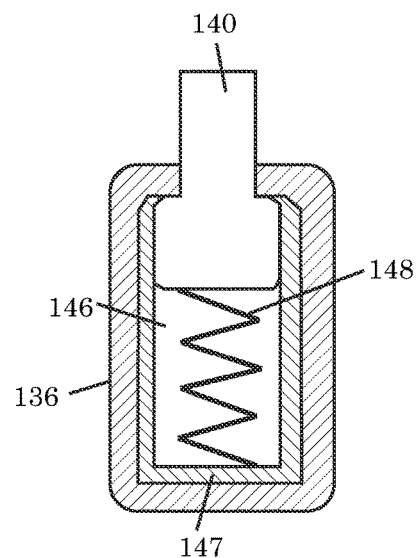
FIG. 6b is another cross-section of a connector.

FIG. 5a shows that the transmitter coil 22 may be connected to the host wireless charging control circuit 30 by a connector 136 and wire 149. In one embodiment, the connector 136 has metallic pins 138, 140 for making contact with the electrical contacts 28, 29 of the transmitter coil 22. The metallic pins 138, 140 may be supported in the body of the connector 136 such that their lengths are adjustable relative to the body of the connector 36. In an embodiment shown in FIG. 6a, the body of the connector 136 includes a cavity 142 shaped to receive the pin 138. One end of the pin 138 is received in the cavity 142, while the other end of the pin 138 extends out of the cavity 142. A spring 144 is attached between a supporting plane 143 in the cavity 142 and the end of the pin 138 inserted in the cavity 142. The projection length of the pin 138, i.e., the length of the pin 138 extending out of the cavity 142, is maximum when the spring 144 is uncompressed and less than maximum when the spring 144 is compressed. As shown in FIG. 6b, the pin 140 may be similarly supported in a cavity 146 in the body of the connector 136, with a spring 148 arranged between a supporting plane 147 in the cavity 146 and the end of the pin 140 inserted in the cavity 146. The springs 144, 148 will enable the pins 138, 140 to have the necessary length and force to make reliable contacts with the electrical contacts 28, 29 (in FIG. 5a) of the transmitter coil 22.

Figure 7A:
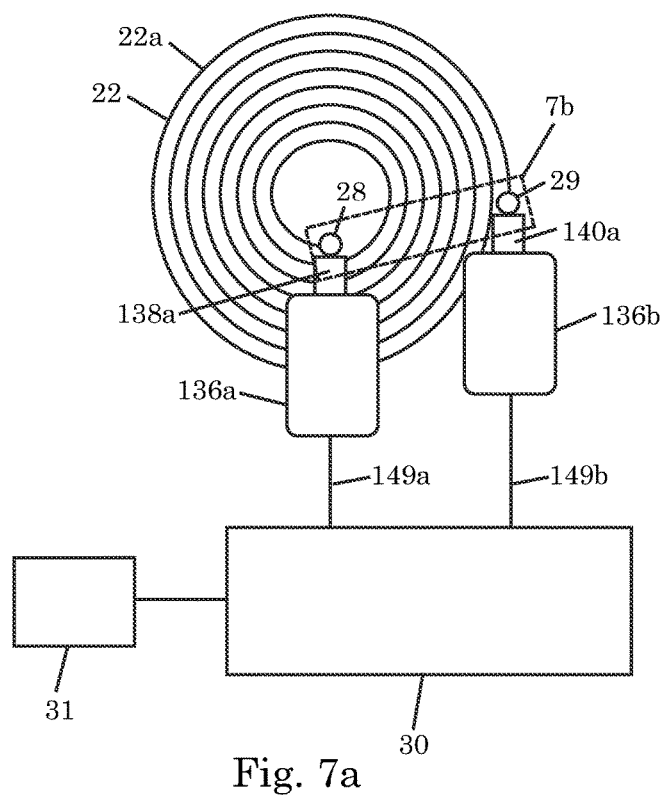
FIG. 7a shows a transmitter coil, in a form factor different from the one shown in FIG. 5a, coupled to a wireless charging control circuit.
Figure 7B:
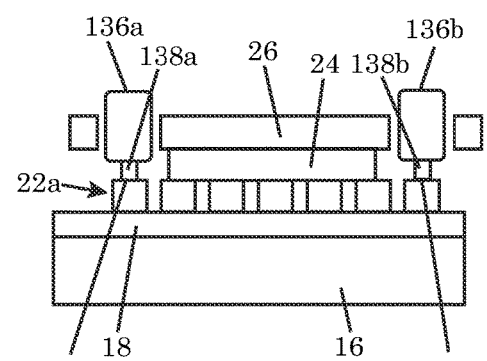

FIG. 7a shows an alternate embodiment where the ends of the flat spiral coil 22a are not connected to leads but terminate directly in electrical contacts 28, 29. In this case, connectors 136a, 136b with metallic pins 138a, 140a and wires 149a, 149b can be used to make the connection between the transmitter coil 22 and the wireless charging control circuit 30. The metallic pins 138a, 140a may have adjustable lengths and may be spring loaded as described above with respect to metallic pins 138, 140 (in FIGS. 6a and 6b). FIG. 7b shows a layer structure at the connection area 7b of FIG. 7a. The insulation layer 24 and EMI absorber layer 26 may include holes to allow the metallic pins 138a, 140a to make contact with the the electrical contacts 28, 29.

Figure 8A:
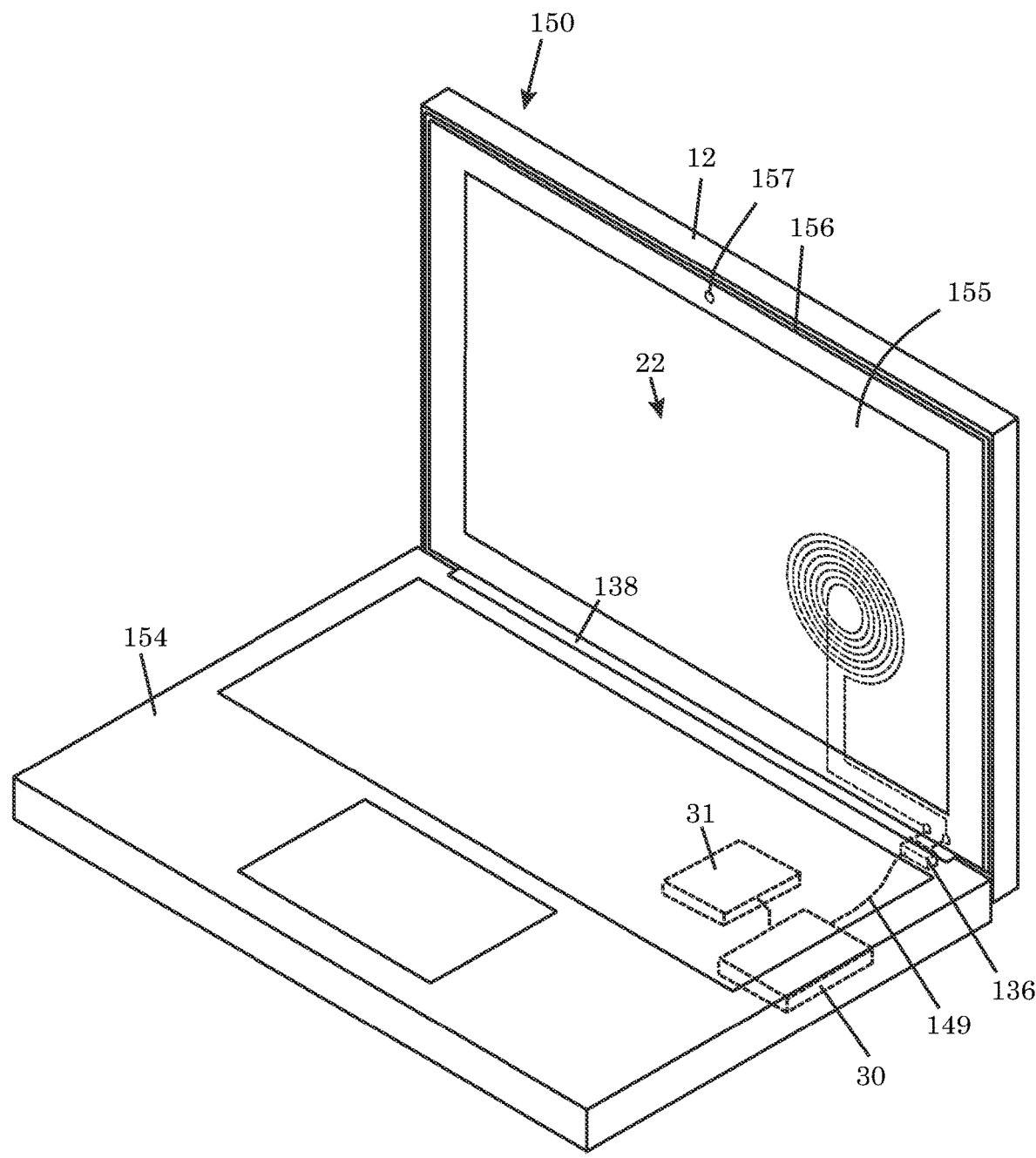
FIG. 8a shows a portable computer incorporating a wireless charging transmitter device.

The transmitter coil form factor shown in FIGS. 5a and 5b can be used with a wireless charging transmitter device form factor such as shown in FIG. 2a. For example, FIG. 8a shows a portable computer 150 having a so-called clamshell factor with a base housing 154 and a cover housing 156 connected by a pivotable joint, such as a hinged joint 158. The base housing 154 may contain components such as a processor, memory, power source, e.g., battery, input devices, e.g., keyboard and touchpad, communication devices, audio devices, and the like. For illustration purposes, the host wireless charging control circuit 30 and host power source 31 are shown in the base housing 154. The cover housing 156 includes a mid-frame (not visible in the drawing) to which a display device 155 and camera 157 are mounted. The wireless charging transmitter cover 12 is mounted on the outer or far side of the mid-frame so as to form a skin on the outer side of the cover housing 156. The connector 136 for connecting the transmitter coil 22 to the host wireless charging control circuit 30 may be located in the hinge joint 158.

Figure 8B:
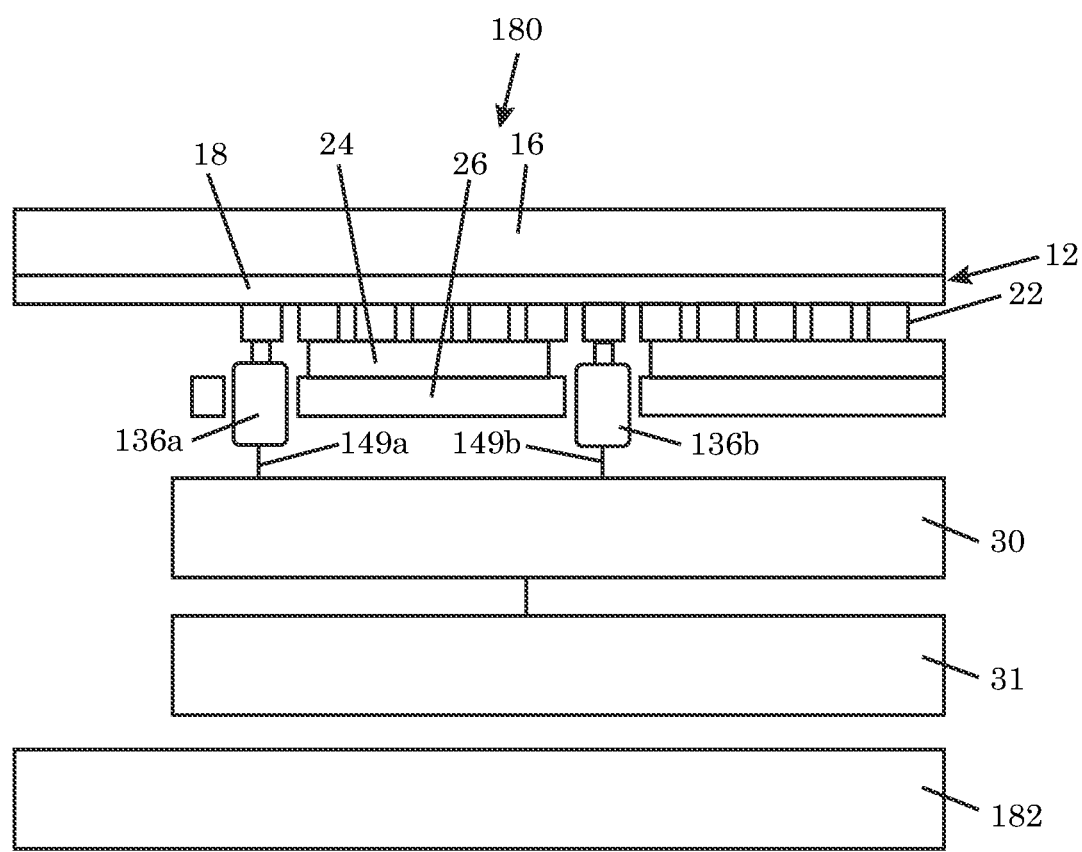
FIG. 8b shows a portable power bank incorporating a wireless charging transmitter device.

The transmitter coil form factor shown in FIGS. 7a and 7b can be used with a wireless charging transmitter device form factor such as shown in FIG. 2b or FIG. 2c. For example, FIG. 8b shows a layer structure of a portable power bank 180 using the transmitter coil form factor of FIGS. 7a and 7b. The structure includes the wireless charging transmitter device 12, which includes the substrate 16, decoration layer 18, transmitter coil 22, insulation layer 24, and EMI absorber layer 26. Between the wireless charging transmitter device 12 and the back housing 182 are the host wireless charging control circuit 30 and the host power source 31. Connectors 136a, 136b and wires 149a, 149b connect the host wireless charging control circuit 30 to the transmitter coil 22. The host wireless charging control circuit 30 is also connected to the host power source 31.

Figure 9A:
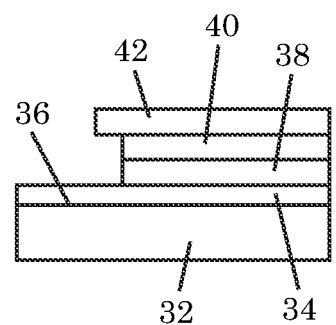
FIG. 9a shows a layer structure of a wireless charging receiver device.
Figure 9B:
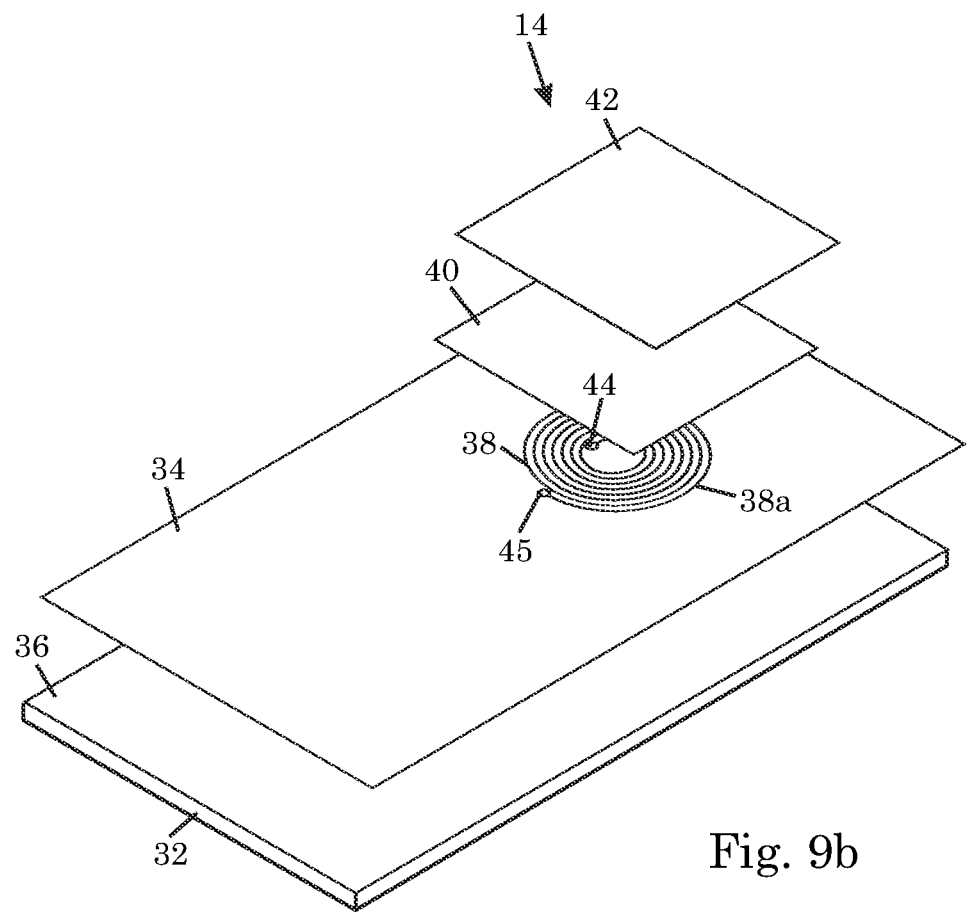

FIGS. 9a and 9b show a layer structure of the wireless charging receiver device 14 according to one embodiment. In these figures, the wireless charging receiver device 14 includes a substrate 32, which in one embodiment is made of glass or glass-ceramic. The substrate 32 will have a cover shape and size dictated by the desired form factor of the wireless charging receiver device 14, or by an area of the parasite device to be covered by the wireless charging receiver device 14. A decoration layer 34 is applied on an inner surface 36 of the substrate 32. A receiver coil 38 is applied on the decoration layer 34. In some cases, the decoration layer 34 may be omitted so that the receiver coil 38 is applied on the inner surface 36 of the substrate 32 without intervention of the decoration layer 34. In the embodiment illustrated in FIG. 9b, the receiver coil 38 has a flat spiral coil 38a, with ends terminating in electrical contacts 44, 45. An insulation layer 40 is applied on the receiver coil 38, and an EMI absorber layer 42 is applied on the insulation layer 40. The EMI absorber layer 42 should cover the entire receiver coil 38 area. Alternatively, the receiver coil 38 may have a form factor such as shown for the transmitter coil in FIG. 5a, i.e., with leads that terminate in the electrical contacts.

Figure 10A:
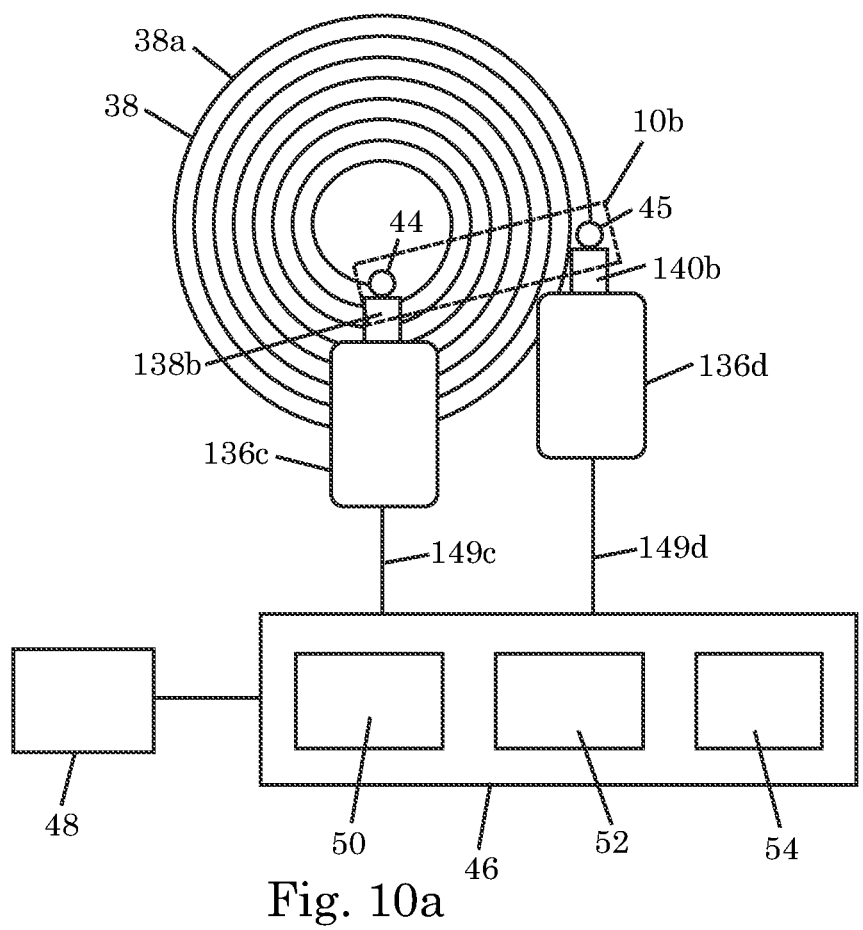
FIG. 10a shows a receiver coil coupled to a wireless charging control circuit.
Figure 10B:
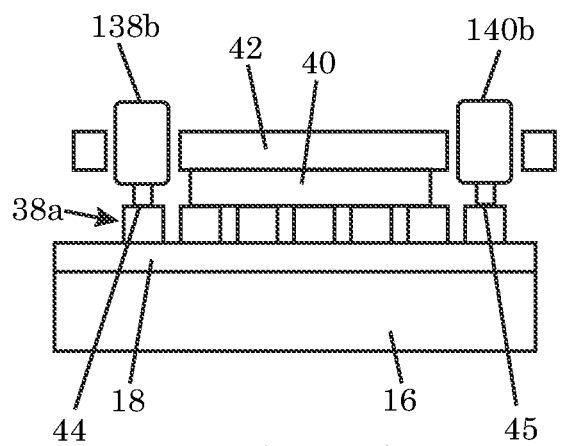

FIG. 10a shows connection of the receiver coil 38 to a "parasite" wireless charging control circuit 46, which is connected to a "parasite" power storage 48. The parasite power storage 48 may be a rechargeable battery, for example. The term "parasite" is intended to associate the wireless charging circuit 46 and the power storage 48 with the parasite device. Metallic pins 138b, 140b of connectors 136c, 136d make contact with the electrical contacts 44, 45, respectively. The wires 149c, 149d of the connectors 136c, 136d are connected to the parasite wireless charging control circuit 46. The metallic pins 138b, 140b may have adjustable lengths and may be spring loaded as described above for the metallic pins 138, 140. FIG. 10b shows a layer structure at the connection area 10b of FIG. 10a. This layer structure is similar to the one described above in FIG. 7b. As shown in FIG. 10a, the parasite wireless charging control circuit 46 may include, for example, an impedance transformer 50, a rectifier 52, and a DC/DC converter 54. (The magnetic field generates alternating current within the receiver coil. Therefore, the receiver coil needs a resonance circuit that shifts the phase of current in some working frequency.) In general, the parasite wireless charging control circuit 46 may have any suitable configuration to convert the alternating current generated within the receiver coil 38 to direct current for charging the parasite power storage 48.

When the receiver coil 38 of the wireless charging receiver device 14 is positioned proximate to the transmitter coil 22 of the wireless charging transmitter device 12, as shown in FIG. 1, the electromagnetic field created by the transmitter coil 22 will generate alternating current within the receiver coil 38. (In one embodiment, the receiver coil 28 and transmitter coil 22 are considered proximate if the distance between them is within 5 mm. The best performance will be realized when the receiver coil 38 and transmitter coil 22 are in direct contact with essentially zero distance between them.) The parasite wireless charging control circuit 46 will convert this alternating current into direct current to charge the parasite power storage 48 of the parasite device 2. For the most efficient coupling of the electromagnetic field to the receiver coil 38, zero gap between the receiver coil 38 and transmitter coil 22 would be ideal. However, in practice, zero gap will not be possible since the receiver coil 38 and transmitter coil 22 are separated by at least the thicknesses of the glass substrates 16 (in FIGS. 4a and 4b), 32 (in FIGS. 9a and 9b). For example, a gap of 3 mm may have a coupling coefficient of 0.56, and a gap of 1 mm may have a coupling coefficient of 0.75. In general, close proximity may mean that a gap between the coils is 3 mm or less, preferably 2 mm or less, and more preferably 1.5 mm or less.

Figure 11:
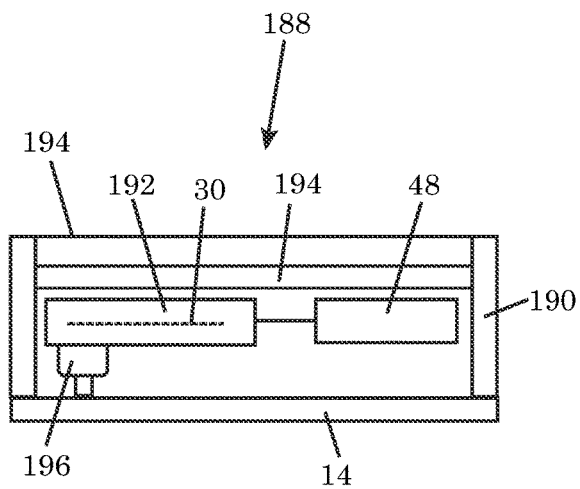
FIG. 11 shows a handheld device with a wireless charging receiver device.

FIG. 11 shows a diagram of a handheld device 188 incorporating a wireless charging receiver device 14. The handheld device 188 has a housing 190 with a front cover 194 and the wireless charging receiver device 14 as the back cover. The details of the wireless charging receiver device 14 are not shown in FIG. 11. Inside the housing 190 is an integrated circuit (IC) board 192, which may include the parasite wireless charging control circuit 46. Also inside the housing 190 is the parasite power storage (or battery) 48. The IC board 192 has connectors 196 which are used to couple the parasite wireless charging control circuit 46 to the receiver coil in the wireless charging receiver device 14.

The decoration layers 18 (e.g., in FIGS. 4a and 4b), 34 (e.g., in FIGS. 9a and 9b) may be opaque or semitransparent so as to allow the decoration layers to function as a black matrix for the display of the target device, i.e., if the wireless charging device is used as a cover at the rear of the display, and/or to hide the interior components of the target device from external view. Preferably, the decoration layers 18, 34 are non-conductive layers having high electrical resistance so as to avoid interference with the electromagnetic field used to transfer energy between the transmitter coil 22 (e.g., in FIGS. 4a and 4b) and the receiver coil 38 (e.g., in FIGS. 9a and 9b). The decoration layers 18, 34 may have any desirable color. Further, the decoration layers 18, 34 may incorporate one or more graphic or textual designs, such as a logo.

In one embodiment, the decoration layers 18, 34 and the transmitter and receiver coils 22, 38 are printed on the substrate 16 (e.g., in FIGS. 4a and 4b), 32 (e.g., in FIGS. 9a and 9b), respectively, using ink printing technology or thin film technology. If printing of multiple colors per printing step is desired, then inkjet printing or other digital printing technique may be used. For printing of a non-conductive layer, such as any of the decorative layers, non-conductive vacuum metallization may be used as an alternative to silk screen printing. The decoration layers 18, 34 and transmitter and receiver coils 22, 38 can be made very thin with printing, e.g., with layer thickness in a range from 10 to 180 μm. Also, the glass substrates 16, 32 can be made thin, e.g., with a thickness of 0.1 to 1.5 mm. This would allow the gap between the transmitter and receiver coils 22, 38 to be minimized for efficient transfer of energy. Also, this would allow the wireless charging transmitter and receiver devices 12, 14 to be thin such that integrating them with the host and parasite devices, respectively, will not significantly increase the thicknesses of these devices.

The insulation layers 24 (e.g., in FIGS. 4a and 4b), 24a (in FIG. 5b), 40 (e.g., in FIGS. 9a and 9b) are used to protect the transmitter and receiver coils 22, 28 against moisture, dust, chemicals, and temperature extremes. The insulation layer 24 may also be used for electrical isolation purposes in the transmitter form factor shown in FIGS. 5a and 5b. The insulation material used in any of these insulation layers may be conformal coating material in one embodiment. Examples of coating materials include acrylic resin, epoxy resin, urethane resin, or silicone resin. The thickness of any of the insulation layers may be in a range from 10 to 200 µm in one embodiment.

The EMI absorber layers 26, 40 are used to absorb electromagnetic frequency interference. Any suitable EMI absorber may be used in the EMI absorber layers 26, 40. Typically, the EMI absorber will be in the form of metallic material filler in polymer resin. The thickness of any of the absorber layers may be in a range from 0.08 mm to 0.25 mm.

Figure 12:
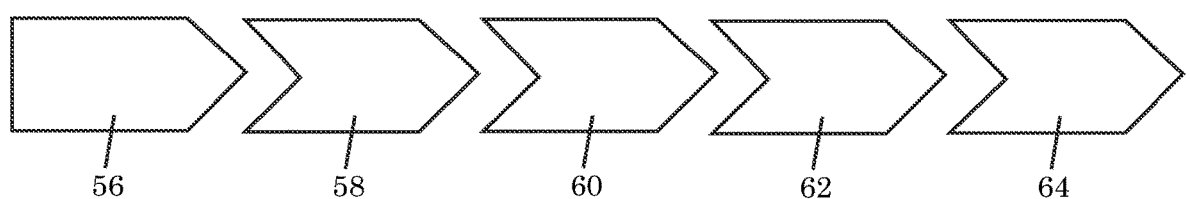
FIG. 12 illustrates a process for making a wireless charging device.

FIG. 12 shows a block diagram of a process for making a wireless charging device, which may be any of the wireless charging transmitter device 12 and receiver device 14, according to one illustrative embodiment. In FIG. 12, at 56, a substrate (corresponding to substrate 16 in FIG. 4b or substrate 32 in FIG. 9a) is provided with a shape and size selected for mounting on a target device (host device or parasite device) so as to cover a select area of the target device. In general, the substrate may have a two-dimensional (2D) cover shape or a three-dimensional (3D) cover shape, such as a dish shape or sled shape. Also, for the purpose of mounting the substrate on the target device, the substrate may include mounting features such as tabs and slots (not shown).

In one embodiment, the substrate that is provided at 56 is made of glass. In another embodiment, the substrate is made of glass-ceramic. The glass or glass-ceramic substrate may be strengthened using any suitable process. In one embodiment, the substrate is made of strengthened glass or glass-ceramic having at least one surface under a compressive stress of at least 200 MPa and a compressively stressed layer having a depth of layer (DOL) of at least 1% of a thickness of the substrate.

The strengthening of the substrate glass may be chemically by ion-exchange or by thermal tempering. In one embodiment, the strengthening is such that the substrate glass has a surface compression layer with compressive stress greater than 200 MPa and a depth of surface compression layer greater than 15 µm. The depth is measured from the surface of the glass into the thickness of the glass. Preferably, the strengthening is such that the glass has a surface compression layer with compressive stress greater than 600 MPa and a depth of surface compression layer greater than 25 µm. More preferably, the strengthening is such that the compressive stress is greater than 650 MPa and the depth of surface compression layer is in a range from 30 µm to 50 µm. In some embodiments, the strengthened glass may be aluminosilicate glass or aluminoborosilicate glass, which can be strengthened by ion-exchange. However, the strengthened glass is not limited to one formed by ion-exchange or thermal tempering. Any suitable means of inducing compressive layers in glass may be used to produce the strengthened glass.

At 58, the process involves printing a decoration layer (corresponding to the decoration layer 18 in FIG. 4b or decoration layer 40 in FIG. 9b) using silk screen printing. Non-conductive color ink (e.g., black, white, or another color) is used in the printing. The method involves depositing the non-conductive ink on a surface (corresponding to the inner surface 20 in FIG. 4b or the inner surface 32 in FIG. 9b) of the substrate using silk screen printing, followed by curing the ink. The printing of the decoration layer may be carried out in stages, e.g., if the decoration layer uses more than one color ink. At 60, the coil (corresponding to transmitter coil 22 in FIG. 4b or receiver coil 38 in FIG. 9b) and electrical contacts (corresponding to contacts 28, 29 in FIG. 4b or electrical contacts 44, 45 in FIG. 9b) are printed on the decoration layer, also using silk screen printing, followed by curing of the ink. For the coil and electrical contacts a conductive ink, such as copper or silver ink, is used in the printing. It should be noted that a different printing method besides silk screen printing may be used in printing of the decoration layer and coil.

At 62, an insulation material is applied on top of the printed coil using brushing or spraying to form an insulation layer (corresponding to insulation layer 24 or insulation layer 40 in FIG. 9b). The insulation layer may also be printed by silk screen printing or other suitable printing method. After the insulation material has been cured, the EMI absorber material is applied on the insulation layer, at 64, to form an EMI absorber layer (corresponding to the EMI absorber layer 26 or EMI absorber layer 42 in FIG. 9b). The EMI absorber layer should cover the whole coil area. The EMI absorber material may be in the form of a sheet with an adhesive that could be applied to the insulation layer. In the case where the coil form factor shown in FIG. 5a is to be printed, the lead in the bridge area (corresponding to lead 22b) can be printed on the insulation layer after step 62 using the same ink and method used for the coil, optionally followed by applying insulation material on the lead, followed by step 64 where the EMI absorber layer is applied over the whole coil area.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

The invention claimed is:

1. A method of making a wireless charging device for an electronic device, comprising:
   depositing a conductive ink on a surface of a substrate or on a decoration layer on the surface of the substrate to form a coil;
   applying an electromagnetic interference absorber layer over the coil; and
   applying an insulation layer over the coil prior to applying the electromagnetic interference absorber layer such that the insulation layer is interposed between the coil and the electromagnetic interference absorber layer,
   wherein the substrate comprises a glass or glass-ceramic and has a shape and size adapted for covering an area of the electronic device.

2. The method of claim 1, wherein depositing the coil comprises depositing a flat spiral coil, and further comprising depositing a lead connected to one end of the flat spiral coil on the insulation layer such that a portion of the lead crossing over the flat spiral coil is isolated from the flat spiral coil by the insulation layer.

3. The method of claim 1, further comprising forming the decoration layer using silk screen printing.

4. The method of claim 1, wherein the decoration layer is opaque or semitransparent.

5. The method of claim 1, wherein a layer thickness of the decoration layer is in a range from 10 µm to 200 µm.

6. The method of claim 1, wherein depositing the coil comprises silk screen printing.

7. The method of claim 1, wherein the conductive ink comprises copper or silver.

8. The method of claim 1, wherein a layer thickness of the coil is in a range from 10 µm to 180 µm.

9. The method of claim 1, wherein the substrate comprises strengthened glass having at least one surface under a compressive stress greater than 200 MPa and a compressively stressed layer having a depth of layer greater than 15 µm.

10. A wireless charging device for an electronic device, comprising:
a substrate comprising a glass or glass-ceramic and having a shape and size adapted for covering an area of the electronic device; and
a layered inductive charging structure formed on a surface of the substrate, the layered inductive charging structure comprising a coil for creating an electromagnetic field in response to an electrical current or for generating an electrical current in response to an electromagnetic field, an electromagnetic interference absorber layer disposed over the coil, and an insulation layer disposed on the coil and in between the coil and the electromagnetic interference absorber layer,
wherein the coil is formed from conductive ink.

11. The wireless charging device of claim 10, wherein the layered inductive charging structure further comprises a decoration layer comprising a non-conductive material, the decoration layer being disposed in between the surface of the substrate and the coil.

12. The wireless charging device of claim 11, wherein a layer thickness of the printed decoration layer is in a range from 10 to 200 µm, and a layer thickness of the printed coil is in a range from 10 to 180 µm.

13. The wireless charging device of claim 11, wherein the decoration layer is opaque or semitransparent.

14. The wireless charging device of claim 10, wherein the coil comprises a flat spiral coil.

15. The wireless charging device of claim 14, wherein the coil further comprises leads connected to the ends of the flat spiral coil, and wherein the leads terminate in electrical contacts.

16. The wireless charging device of claim 15, wherein one of the leads crosses over at least a portion of the flat spiral coil and is isolated from the flat spiral coil by an insulation material.

17. The wireless charging device of claim 10, wherein the substrate is made of strengthened glass having at least one surface under a compressive stress greater than 200 MPa and a compressively stressed layer having a depth of layer greater than 15 µm.

18. A handheld device, comprising
a housing;
the wireless charging device of claim 10 mounted on a side of the housing as a cover; and
a wireless charging control circuit and a power storage disposed in the housing, the wireless charging control circuit being coupled to the coil and the power storage and configured to charge the power storage with the electrical current generated within the coil.

19. A method of making a wireless charging device for an electronic device, comprising:
depositing a coil on a surface of a substrate or on a decoration layer on the surface of the substrate using a conductive ink,
wherein the substrate comprises a strengthened glass or glass-ceramic having at least one surface under a compressive stress of at least 200 MPa and a compressively stressed layer having a depth of layer of at least 1% of a thickness of the substrate, and the substrate has a shape and size adapted for covering an area of the electronic device.

20. A wireless charging device for an electronic device, comprising:
a substrate comprising a strengthened glass or glass-ceramic having at least one surface under a compressive stress of at least 200 MPa and a compressively stressed layer having a depth of layer of at least 1% of a thickness of the substrate and having a shape and size adapted for covering an area of the electronic device; and
a layered inductive charging structure formed on a surface of the substrate, the layered inductive charging structure comprising a coil for creating an electromagnetic field in response to an electrical current or for generating an electrical current in response to an electromagnetic field,
wherein the coil is formed from conductive ink.

21. A handheld device, comprising
a housing;
the wireless charging device of claim 20 mounted on a side of the housing as a cover; and
a wireless charging control circuit and a power storage disposed in the housing, the wireless charging control circuit being coupled to the coil and the power storage and configured to charge the power storage with the electrical current generated within the coil.

* * * * *